(12) United States Patent
Koide (10) Patent No.: US 9,329,104 B2
(45) Date of Patent: May 3, 2016

(54) TIRE TESTING DEVICE

(75) Inventor: Masafumi Koide, Hidaka (JP)

(73) Assignee: BRIDGESTONE CORPORATION, Tokyo (JP)

( * ) Notice: Subject to any disclaimer, the term of this patent is extended or adjusted under 35 U.S.C. 154(b) by 32 days.

(21) Appl. No.: 14/127,571

(22) PCT Filed: Mar. 22, 2012

(86) PCT No.: PCT/JP2012/001990
§ 371 (c)(1),
(2), (4) Date: Dec. 19, 2013

(87) PCT Pub. No.: WO2012/176359
PCT Pub. Date: Dec. 27, 2012

(65) Prior Publication Data
US 2014/0109662 A1    Apr. 24, 2014

(30) Foreign Application Priority Data
Jun. 23, 2011  (JP) ................. 2011-139740

(51) Int. Cl.
*G01M 17/02*   (2006.01)

(52) U.S. Cl.
CPC .................... *G01M 17/022* (2013.01)

(58) Field of Classification Search
None
See application file for complete search history.

(56) References Cited

U.S. PATENT DOCUMENTS

| | | | |
|---|---|---|---|
| 5,027,649 A * | 7/1991 | Himmler | G01M 17/022 73/146 |
| 6,591,669 B1 * | 7/2003 | Serra et al. | 73/146 |
| 7,254,995 B2 * | 8/2007 | Leska et al. | 73/146 |
| 2002/0011102 A1 * | 1/2002 | Leska et al. | 73/146 |
| 2004/0050150 A1 * | 3/2004 | Jahn et al. | 73/146 |
| 2004/0255661 A1 * | 12/2004 | Nagai et al. | 73/146 |
| 2006/0218999 A1 * | 10/2006 | Friske | G01M 17/022 73/146 |
| 2006/0243042 A1 | 11/2006 | Leska, Sr. et al. | |
| 2010/0031740 A1 * | 2/2010 | Olex et al. | 73/146 |
| 2011/0066291 A1 * | 3/2011 | Morita | G01M 17/0074 700/279 |
| 2012/0085158 A1 * | 4/2012 | Murakami | G01M 17/021 73/146 |

(Continued)

FOREIGN PATENT DOCUMENTS

| | | |
|---|---|---|
| CN | 1969177 A | 5/2007 |
| GB | 1 323 201 | 7/1973 |

(Continued)

OTHER PUBLICATIONS

Extended European Search Report, dated Nov. 18, 2014, issued in European Patent Application No. 12803055.8.

(Continued)

*Primary Examiner* — Andre Allen
(74) *Attorney, Agent, or Firm* — Sughrue Mion, PLLC (57) ABSTRACT

An object of the present invention is to provide an inside drum-type tire testing device, which can significantly improve operability and test precision, reliably has strength high enough to eliminate any concern about strength thereof, and has relatively small size and significantly small floor-occupied area. Specifically, the present invention provides a tire testing device, comprising: an inside drum-type cylindrical rotating drum 1; a fixed support member 2 for surrounding the rotating drum 1 from the outer peripheral side of the drum via rotation guide means 3; and a linear motor 4 provided between the rotating drum 1 and the fixed support member 2, for rotationally driving the rotating drum 1.

12 Claims, 8 Drawing Sheets

(56) References Cited

U.S. PATENT DOCUMENTS

| | | | |
|---|---|---|---|
| 2013/0247657 A1* | 9/2013 | Sumitani | G01M 17/021 73/146 |
| 2014/0034767 A1* | 2/2014 | Permuy | B02C 17/24 241/284 |
| 2015/0027215 A1* | 1/2015 | Wakazono | G01M 17/02 73/146 |

FOREIGN PATENT DOCUMENTS

| | | |
|---|---|---|
| JP | 1-107128 A | 4/1989 |
| JP | 11-3261 42 A | 11/1999 |
| JP | 2004-191108 A | 7/2004 |
| JP | 3123589 U | 7/2006 |
| JP | 2006-226778 A | 8/2006 |
| JP | 2007-78667 A | 3/2007 |
| JP | 2008-14667 A | 1/2008 |
| JP | 2008-82709 A | 4/2008 |

OTHER PUBLICATIONS

Communication dated Dec. 9, 2014, issued by the Japan Patent Office in corresponding Japanese Application No. 2013-521410.

International Search Report of PCT/JP2012/001990 dated May 1, 2012.

Communication dated Jul. 6, 2015 from the State Intellectual Property of the People's Republic of China in counterpart application No. 201280031032.7.

* cited by examiner

TIRE TESTING DEVICE

CROSS REFERENCE TO RELATED APPLICATIONS

This is a National Stage of International Application No. PCT/JP2012/001990 filed Mar. 22, 2012, claiming priority based on Japanese Patent Application Nos. 2011-139740 filed Jun. 23, 2011 the contents of all of which are incorporated herein by reference in their entirety.

TECHNICAL FIELD

The present invention relates to a tire testing device and in particular to an inside drum-type tire testing device having improved operability and test precision in various tests for tires, as well as increased strength and reduced size of the device.

BACKGROUND ART

An inside drum-type tire testing device enables a test to be carried out at a higher tire running speed than a what is called "flat belt-type" tire testing device. Further, an inside drum-type tire testing device splashes less powder of worn tire and can more easily realize states of wet road surface, road surface having ice and/or snow thereon, and the like, than outside drum-type and disc-type tire testing devices. Accordingly, various types of inside drum-type tire testing devices have been proposed as shown in PTLs 1 to 4.

For example, a tire testing device disclosed in PTL 1 provides a tire testing device comprising: a disc-shaped rear wall; a drum having a cylindrical peripheral wall provided along the outer peripheral end of the rear wall such that the drum has an open end on the front side thereof; and an endless road surface as an inner surface of the peripheral wall of the drum rotating around a horizontal axis, wherein a tire is run on the endless road surface and a water receiving cover is characteristically provided in a fixed manner in a region substantially corresponding to the upper half portion of the peripheral wall of the drum. According to the tire testing device of PTL 1, there can be obtained an effect that "scattering of water from a position above a tire testing position is prevented during a wet test, so that depth of water at the tire testing position is made stable to improve operability of the test and accuracy of test data", which effect is conspicuous "in particular in a wet test in a low-speed range up to approximately 60 km/hour".

CITATION LIST

Patent Literature

PTL 1: JP-A 11-326142
PTL 2: JP-A 2007-078667
PTL 3: JP-A 2008-014667
PTL 4: JP-A 2008-082709

SUMMARY OF THE INVENTION

Technical Problems

The inside drum-type tire testing devices of PTLs 1 to 4, however, unanimously share a structure in which a rear wall closing one end side of a cylindrical rotating drum is connected via a drive shaft with a motor provided on the outer side of the drum, so that the drive shaft as a cantilever beam supports weights of the drum, load exerted by a tire pressed against the inner peripheral surface of the drum, and the like. As a result, it is inevitable in each of PTLs 1 to 4 to carry out all the necessary operations, including setting a test tire in the rotating drum of the tire testing device and taking the test tire out of the rotating drum, from the other end or the open end side of the rotating drum, which naturally results in poor operability of the testing device. Further, there arise other problems in each of PTLs 1 to 4 such as: poor test precision due to eccentric rotation of the rotating drum cantilever-supported by the drive shaft; concern about the strength of the testing device cantilever-supported as described above; a relatively large size of the testing device due to provision of the motor and the drive shaft on the outer side of the rotating drum; and the tire testing device inevitably requires a significantly large area for installment.

The present invention aims at solving such problems of the inside drum-type tire testing devices of PTLs 1 to 4 as described above and an object thereof is to provide a tire testing device equipped with an inside drum-type cylindrical rotating drum, which device can significantly improve operability and test precision, reliably has strength high enough to eliminate any concern about strength thereof, and also has relatively small size and significantly small floor-occupied area.

Solution to the Problems

A tire testing device of the present invention includes an inside drum-type cylindrical rotating drum, a cylindrical fixed support member, and a linear motor provided between the rotating drum and the fixed support member for rotationally driving the rotating drum. The fixed support member is provided on a floor such that it supports the rotating drum by surrounding the drum from the outer peripheral side of the drum via rotation guide means constituted, e.g. guide rails, guide grooves and the like. The rotating drum may be structured as a cage wheel, for example.

Various types of liner motors such as a liner induction motor (LIM), a linear synchronous motor (LSM) and the like can be used as the linear motor.

It is preferable in the tire testing device of the present invention as described above that a pseudo-road surface is provided on an inner peripheral surface of the rotating drum and that the pseudo-road surface is formed by plural segments having predetermined lengths in the circumferential direction of the rotating drum, e.g. plural segments collectively constituting a replica road surface like an asphalt-paved road surface, a concrete-paved road surface, etc.

Further, it is preferable that the tire testing device of the present invention has water supply means for spraying water on the pseudo-road surface and water retrieval means for recycling used water.

Yet further, it is preferable that an inner surface of the pseudo-road surface provided on the inner peripheral surface of the rotating drum has tapered faces at respective end portions, in the axial direction of the rotating drum, thereof such that thicknesses of the tapered faces decrease toward respective outer edges in the drum axial direction of the inner surface. The tapered faces may be tapered in either a convex or concave way, for example.

It is preferable that each tapered face is formed in a region ranged, from the corresponding outer edge in the drum axial direction of the inner surface of the pseudo-road surface provided on the inner peripheral surface of the rotating drum, to the corresponding inner position on the inner side in the drum axial direction of the inner surface of the pseudo-road surface, the inner position being on the inner side in the drum axial direction of the outer edge by 5% to 30% of the total width in the drum axial direction of the inner surface.

Yet further, it is preferable that drainage grooves are formed in the inner surface of the pseudo-road surface so as to either extend continuously or appear intermittently, for example.

These drainage grooves preferably extend to the respective edges in the drum axial direction of the inner surface of the pseudo-road surface in terms of facilitating drainage. It is preferable that the drainage grooves are formed predominantly on the outer side, in the axial direction of the rotating drum, of a region in which a tire is run with load exerted thereon in the inner surface of the pseudo-road surface in terms of accurately determining performances in a wet condition inherent to the tire, although the drainage grooves may be formed in the region in which a tire is run with load exerted thereon.

It is preferable that the drainage grooves extend at least to the respective edges, in the axial direction of the rotating drum, of the inner surface of the pseudo-road surface. In a case where tapered faces are provided at the respective end portions in the drum axial direction of the pseudo-road surface as described above, it is preferable that the drainage grooves extend at least to respective innermost positions in the axial direction of the rotating drum, of the respective tapered faces.

The drainage grooves may be directional grooves orientated to a direction along flow lines of drainage in a case where the rotational direction of the rotating drum is fixed. On the other hand, the drainage grooves may be intersecting slant grooves where grooves intersect each other to extend, e.g. in opposite directions, in a case where the rotational direction of the rotating drum is not fixed to a specific direction.

It is preferable that depths of the drainage grooves gradually increase toward the respective end portions of each segment in terms of facilitating drainage by centrifugal force during rotation of the rotating drum.

Groove width and groove depth of each drainage groove are preferably in the range of 0.5 mm to 3.0 mm and in the range of 0.5 mm to 15.0 mm, respectively. It is preferable that the drainage grooves are formed, for each side in the drum axial direction of each segment, within a region ranged from the edge in the drum axial direction of the inner surface of the pseudo-road surface to a position on the inner side, by 30% of the drum axial direction width of the pseudo-road surface, in the drum axial direction from the inner surface edge, to avoid the center portion in the drum axial direction of the pseudo-road surface, although the drainage grooves could be formed over the entire inner surface of the pseudo-road surface.

Further, it is preferable that the tire testing device of the present invention has: tire support means for supporting a tire such that a ground contact surface thereof is brought into contact with the pseudo-road surface, examples of the tire support means including a support stand having a horizontal rotational axis on which the tire is to be mounted; a load-adjusting member provided in the tire support means, for pressing the ground contact surface of the tire against the pseudo-road surface by a desired force, examples of the load-adjusting member including a load-adjusting motor; and a braking system provided in the tire support means, for exerting braking force on the tire, examples of the braking system including a mechanical disc braking system, an electronic braking system and the like.

Yet further, it is preferable that the tire testing device of the present invention has: a driving/braking force generating unit provided instead of the aforementioned braking system in the tire support means, for exerting on the tire driving force/braking force necessary for rotating the tire at a desired peripheral speed, example of the driving/braking force generating unit including a driving/braking force generating motor; a posture-adjusting mechanism provided in the tire support means, for adjusting a posture in which the ground contact surface of the tire is in contact with the pseudo-road surface; and an actuator provided in the tire support means, for actuating the posture-adjusting mechanism to change a posture in which the ground contact surface of the tire is in contact with the pseudo-road surface.

Yet further, it is preferable that the tire testing device of the present invention has cooling means for cooling water on the pseudo-road surface to form an ice layer over the pseudo-road surface.

Advantageous Effect of the Invention

According to the tire testing device of the present invention, a test for a tire can be carried out as desired by: preparing a tire testing device including an inside drum-type cylindrical rotating drum, a cylindrical fixed support member, and a linear motor provided between the rotating drum and the fixed support member, wherein the fixed support member is provided on a floor such that it supports the rotating drum by surrounding the drum from the outer peripheral side of the drum via rotation guide means; setting a tire such that the tire is in contact with a pseudo-road surface provided on an inner peripheral surface of the rotating drum; and rotationally driving the rotating drum relative to the fixed support member at a desired speed by the linear motor.

As a result, in the present invention it is possible to: make an access to the rotating drum from either side in the axial direction thereof, which significantly improves operability of various tests; and enhance strength of the tire testing device in structural terms by supporting the rotating drum, the test tire and the like by the fixed support member disposed on a floor surface, which effectively eliminates a concern about insufficient strength of the testing device.

Further, in the present invention it is possible to directly support the rotating drum by the fixed support member without provision of an external drive motor and an external drive shaft connect with the rotating drum as in the prior art, which eliminates a concern about poor test precision due to eccentric rotation of the rotating drum and enables making the testing device compact and a floor area occupied by the testing device sufficiently small.

The linear motor can be easily realized in the present invention by, for example, using the rotation guide of the rotating drum, i.e. providing a thrust coil on the fixed support member side; providing permanent magnets of which magnetic poles are not affected by the thrust coil on the rotating drum side; and controllably generating thrust by sequentially changing magnetic poles of electromagnets of the thrust coil.

Lubrication between the rotating drum rotated at a desired speed and the fixed support member can be realized in the present invention by either: fluid lubrication using liquid like water or gas like air injected therebetween; or lubricant lubrication using a lubricant stably existing therebetween or a lubricant oozing from at least one of the rotating drum or the fixed support member impregnated with the lubricant; or any other appropriate method.

The pseudo-road surface can be easily attached, removed or changed and individual segments at specific positions thereof can be easily maintained and replaced according to necessity by constituting the pseudo-road surface of plural segments having predetermined lengths in the circumferential direction of the rotating drum and jointed to each other with no gap therebetween in the present invention.

A wet performance test of a tire can be carried out and water used by the test can be recycled for next use to realize good economy, by providing the tire testing device with the water supply means for spraying water on the pseudo-road surface and the water retrieval means for recycling used water in the present invention.

A concern about splash of water toward the outside of the device can be eliminated in an effective manner in the present invention by providing a drainage guide surrounding the fixed support member as a part of the water retrieval means such that the drainage guide communicates with a drain tank because then water drained from the pseudo-road surface inside the drainage guide can be smoothly introduced into the drain tank via the drainage guide regardless of rotational speed of the rotating drum.

Further, conditions of sprayed water, e.g. thickness of water film on the pseudo-road surface, can be reliably made stable in the present invention by providing an inner surface of the pseudo-road surface disposed on the inner peripheral surface of the rotating drum with tapered faces at respective end portions in the axial direction of the rotating drum of the inner surface such that thicknesses of the tapered faces decrease toward respective outer edges in the drum axial direction of the inner surface (the tapered faces may be either flat or curved, for example, or have other shapes) because then water sprayed on the pseudo-road surface can be efficiently drained due to centrifugal force and the like.

Yet further, a wet performance test can be carried out in a stable manner with effectively enhanced test precision in the present invention by forming drainage grooves in the inner surface of the pseudo-road surface because then water in the center region in the drum axial direction of the pseudo-road surface is further more effectively drained due to centrifugal force and the like, thereby making conditions of water film formed on the pseudo-road surface by spraying water thereon and the like more stable and reliable.

Yet further, load exerted on a test tire can be increased/decreased easily, rapidly and accurately as desired in the present invention by: providing one end side in the drum axial direction of the tire testing device with the tire support means for supporting the test tire such that a ground contact surface thereof is in contact with the pseudo-road surface; and providing the tire support means with the load-adjusting member for controlling pressing force exerted by the test tire against the pseudo-road surface, e.g. a load-adjusting motor.

Yet further, rotational peripheral speed of a test tire relative to rotational speed of the rotating drum can be adjusted appropriately and thus a desired slip ratio and the like can be easily imparted under a relatively simple structure in the present invention by providing the tire support means with the braking system for applying braking force on the test tire such as a mechanical disc braking system, an electronic braking system, and a commercially available ABS braking system.

In this connection, the rotational peripheral speed of a test tire can be either decreased or increased relative to the peripheral speed of the pseudo-road surface on the rotating drum, according to necessity, to realize various running states of a vehicle on the pseudo-road surface in the present invention by providing the tire support means with the driving/braking force generating unit such as a driving/braking force generating motor, instead of the braking system, for exerting driving/braking force on the tire.

Further, a test can be carried out under various rotating postures of a test tire in the present invention by providing the tire support means with the posture-adjusting mechanism for adjusting a posture (e.g. a camber angle and a slip angle) in which the ground contact surface of the tire is in contact with the pseudo-road surface.

Yet further, a desired posture in which the ground contact surface of the tire is in contact with the pseudo-road surface as desired can be easily, rapidly and accurately realized in the present invention by providing the tire support means with an actuator, e.g. a motor, for actuating the posture-adjusting mechanism to change a posture in which the ground contact surface of the tire is in contact with the pseudo-road surface.

Yet further, an on-ice performance test can be carried out for a test tire in the present invention by providing the tire testing device with the cooling means for cooling water on the pseudo-road surface to form an ice layer over the pseudo-road surface.

DESCRIPTION OF THE EMBODIMENTS

An embodiment of the present invention will be described with reference to the drawings hereinafter.

Figure 1A:
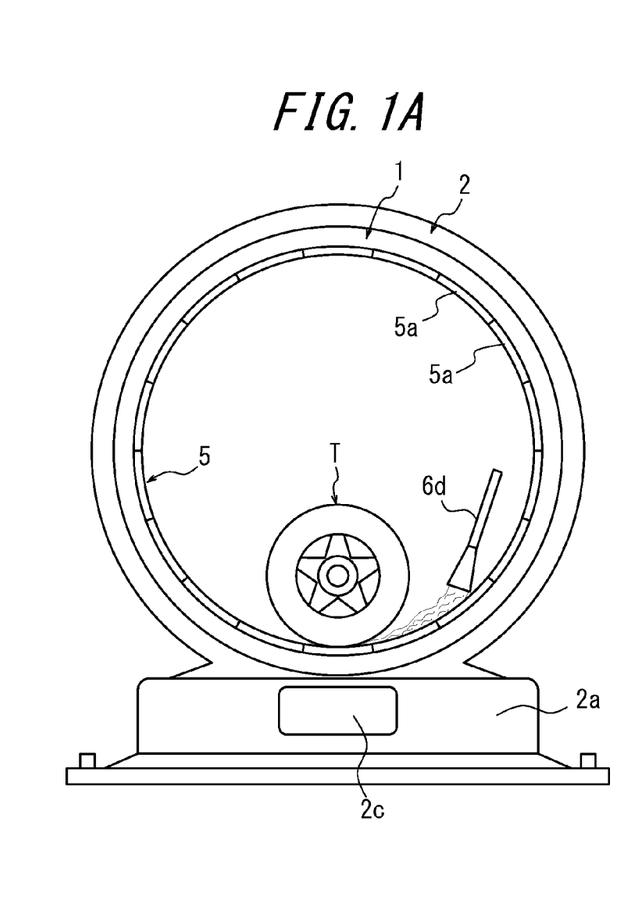
FIG. 1A is an outline front view showing one embodiment of a tire testing device of the present invention.
Figure 1B:
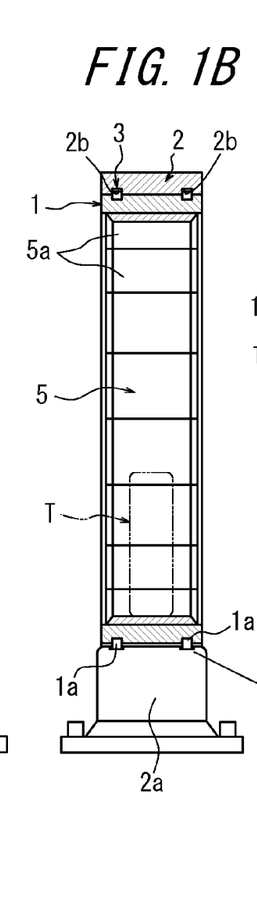
FIG. 1B is a partially-exploded cross sectional side view of the tire testing device.

In FIG. 1A and FIG. 1B, reference number 1 represents an inside drum-type cylindrical rotating drum wherein both ends in the axial direction thereof are opened and reference number 2 represents a cylindrical fixed support member for supporting the rotating drum 1 by surrounding the entire circumference of the drum from the outer peripheral side of the drum.

The fixed support member 2 is disposed on a floor surface via a fixation base 2a. A pair of rails 1a, for example, is provided in parallel to each other on an outer peripheral surface of the rotating drum 1. A pair of guide grooves 2b corresponding to the pair of rails 1a is formed in an inner peripheral surface of the fixed support member 2. The pair of rails 1a and the guide grooves 2b engaged therewith collectively constitute a rotation guide 3 for guiding rotation of the rotating drum 1 and preventing the rotating drum 1 from coming off from the fixed support member 2 in the axial direction thereof.

A linear motor as drive means for rotationally driving the rotating drum 1 is provided between the rotating drum 1 and the fixed support member 2 in the present embodiment.

Figure 2A:
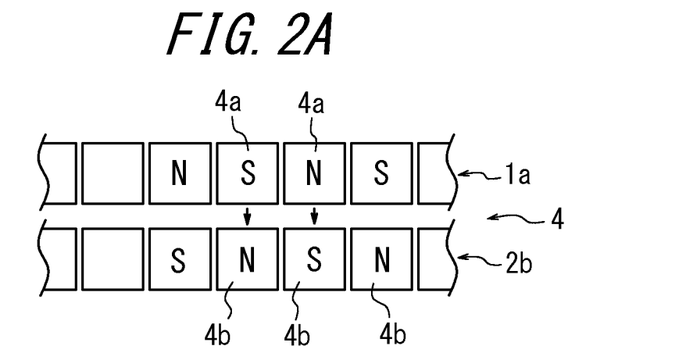
FIGS. 2A-2C are developed plan views each conceptually showing a linear motor.
Figure 2B:
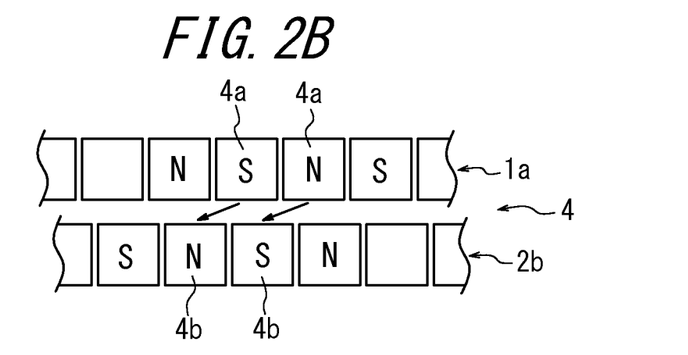
Figure 2C:
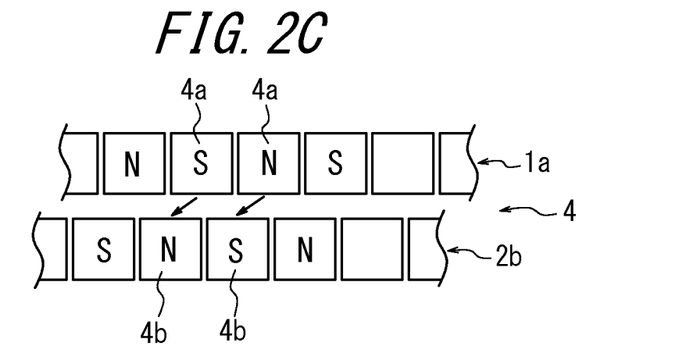

The linear motor may be a linear synchronous motor 4, as is exemplarily and schematically shown in the developed views of FIGS. 2A to 2C. The linear synchronous motor 4 can be constituted, for example, of: permanent magnets 4*a* provided on a side surface of at least one of the rails 1*a* preferably over the entire circumference of the rail such that polarities of the permanent magnets 4*a* change alternately; and electromagnets 4*b* as thrust magnets provided on a side surface facing the aforementioned side surface of the rail 1*a*, of at least one of the guide grooves 2*b*, preferably over the entire circumference of the guide groove such that polarities of the electromagnets 4*b* change alternately. The rotating drum 1 can be stopped by setting magnetic poles of the respective electromagnets 4*b* on the guide groove side to be reverse polarities of magnetic poles of the corresponding respective permanent magnets 4*a* on the rail side, so that the respective permanent magnets 4*a* are magnetically attracted by the corresponding electromagnets 4*b*, as shown in FIG. 2A.

On the other hand, rotational drive of the rotating drum 1 can be carried out by sequentially switching magnetic poles of the electromagnets 4*b* on the guide groove side to reverse polarities, to sequentially make the electromagnets 4*b* magnetically attract the permanent magnets 4*a* on the rail side. The rotating drum 1 is rotated at speed corresponding to the switching speed of magnetic poles.

In the arrangements described above, the rotating drum 1 can be rotated relative to the fixed support member 2 disposed on a floor surface via the fixation base 2*a* at desired speed by the very small linear motor 4. This rotational drive of the rotating drum 1 can be carried out in a state where both ends in the axial direction of the cylindrical rotating drum 1 are opened, whereby operability satisfactorily improves when a tire T is set on a pseudo-road surface 5 provided on the inner peripheral surface of the rotating drum 1 in various tests.

Further, in the arrangements described above, load exerted by the fixed support member 2, the rotating drum 1 and the tire T is supported by the fixation base 2*a* of the fixed support member 2 right under the load, whereby strength of the tire testing device satisfactorily enhances in structural terms; the tire testing device can be made satisfactorily compact; and satisfactorily circular (non-eccentric) rotation of the rotating drum 1 is well ensured.

The rotating drum 1 slides on the inner peripheral surface of the fixed support member 2 when the rotating drum 1 is rotated by the linear motor 4 described above. It is therefore preferable that lubrication is provided between the rotating drum 1 and the fixed support member 2 in order to effectively prevent abrasion from occurring between the rotating drum 1 and the fixed support member 2, as described above.

The pseudo-road surface 5 to be prepared on the inner peripheral surface of the rotating drum 1 over the entire circumference thereof without any gap, for a desired test of a tire T, is preferably constituted of plural segments 5*a* having predetermined lengths in the circumferential direction of the rotating drum 1 as shown in FIG. 1A and FIG. 1B, in terms of facilitating installation, localized repair, replacement and the like of the pseudo-road surface 5.

The number of the segments is preferably at least three in this regard.

Figure 3A:
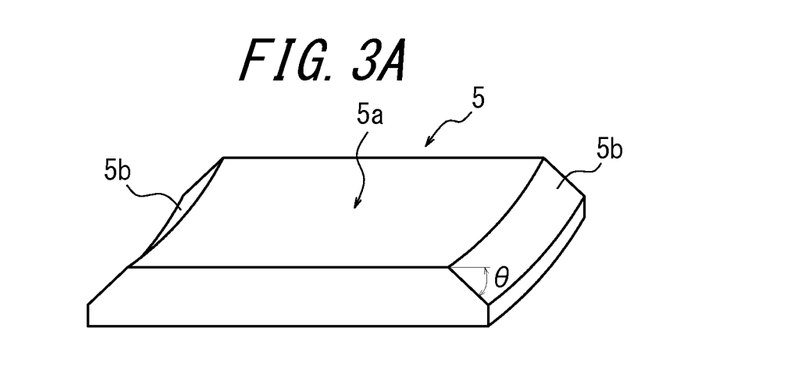
FIG. 3A is a perspective view exemplarily showing a segment constituting a pseudo-road surface.
Figure 3B:
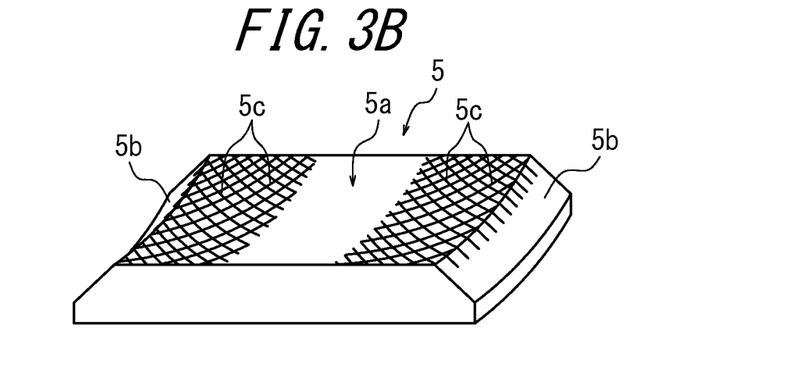
FIG. 3B is a perspective view showing a modified example of the segment.

The pseudo-road surface 5, specifically each of the pseudo-road segments 5*a* in the aforementioned example, is preferably provided with tapered faces 5*b* at respective end portions in the axial direction of the rotating drum thereof such that thicknesses of the tapered faces decrease toward respective edges in the drum axial direction of the segment (the tapered faces may be tapered in either a convex or concave way, for example), as exemplarily shown in FIG. 3A and FIG. 3B. Further, drainage grooves 5*c* are preferably formed in an inner surface of the pseudo-road surface segment 5 such that the drainage grooves 5*c* extend at least in respective end portions in the drum axial direction of the segment 5*a*, as shown in FIG. 3B. The drainage groove 5*c* may be a continuous groove, for example, as shown in FIG. 3B.

Figure 3C:
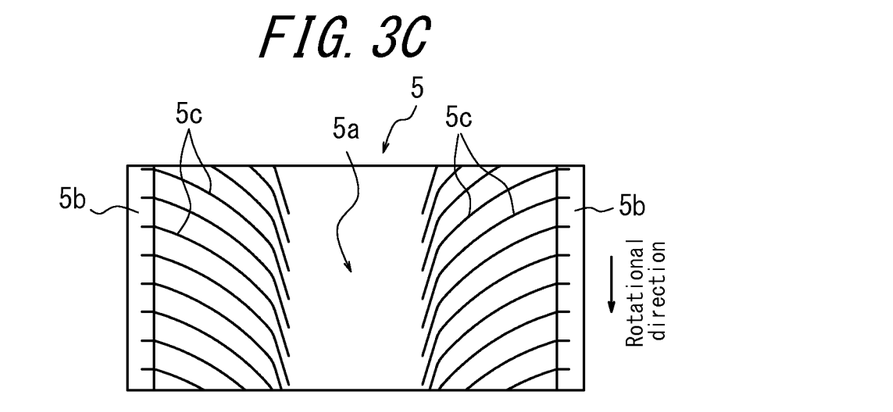
FIG. 3C is a developed plan view showing another modified example of the segment.

Although a taper angle θ formed by each tapered face 5*b* with respect to the inner surface of the pseudo-road surface 5 is 45° in FIG. 3A and each continuous drainage groove 5*c* extends at an angle of 45° with respect to the circumferential direction of the rotating drum 1 in FIG. 3B, these angles may be appropriately changed as desired. Further, although dimensions of each continuous drainage groove 5*c* are depth: 4 mm and width: 1 mm and the drainage grooves 5*c* are formed to intersect each other to cover a region having width corresponding to 30% of the drum axial direction width of the pseudo-road surface, the width being measured from the innermost edge in the drum axial direction of the tapered face 5*b* of the pseudo-road surface 5 at each side in the drum axial direction of each segment 5*a* in the example shown in FIG. 3B, dimensions of the continuous drainage grooves 5*c* and ranges in which the drainage grooves are formed may be appropriately changed as desired. Yet further, the continuous drainage grooves 5*c* may extend in a direction along flow lines of drainage as shown in FIG. 3C in a case where the rotational direction of the rotating drum 1 is specified in a fixed direction.

Figure 1C:
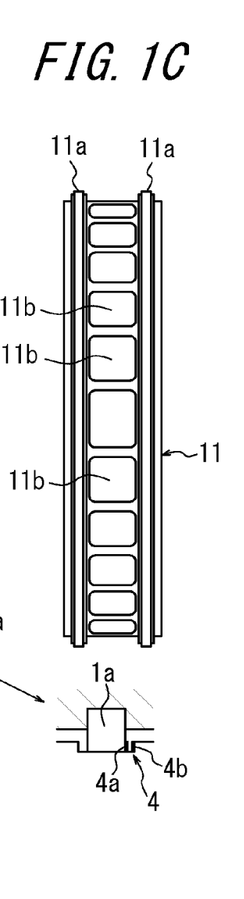
FIG. 1C is a side view showing a modified example of a cylindrical rotating drum of the tire testing device.

A side view of FIG. 1C shows a modified example of the cylindrical rotating drum in which: the weight of the rotating drum 11 itself is reduced by forming in the outer peripheral surface of the rotating drum 11 plural rectangular holes 11*b* in the circumferential direction with predetermined intervals therebetween between a pair of rails 11*a* provided in parallel to each other on the outer peripheral surface of the drum; the segments 5*a* of the pseudo-road surface 5 are made of a transparent material such as acryl resin and attached to the inner peripheral surface of the rotating drum 11 such that transparent portions of the segments 5*a* correspond to the rectangular holes 11*b*, respectively, whereby drainage performance of a test tire T in a wet condition and the like can be observed through, for example, an observation hole 2*c* formed in the fixation base 2*a* shown in FIG. 1A.

Figure 4:
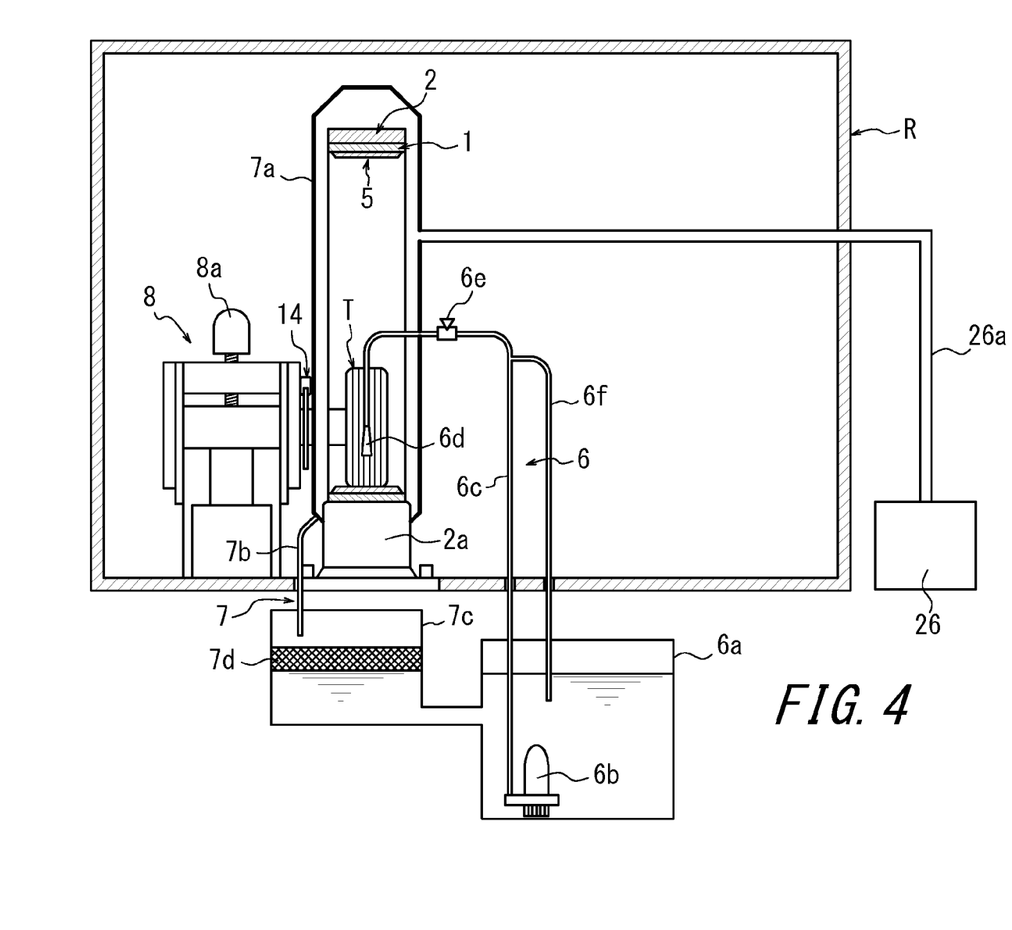
FIG. 4 is a partial cross sectional outline side view showing a water-recycling path.

Such a wet performance test of a test tire T as described above can be carried out by: providing water supply means 6 for spraying water on the pseudo-road surface 5 of the rotating drum 1, 11 disposed in a sectioned chamber R, as well as water retrieval means 7 for recycling used water for a next wet performance test; and sucking up water from a water supply tank 6*a* by a submersible pump 6*b*, delivering water thus sucked up through water supply piping 6*c* and spraying a predetermined amount of the water via a water supply nozzle 6*d* (see FIG. 1A) onto the pseudo-road surface 5 or a tire T rotated in a state where a ground contact surface of a tread thereof is pressed against the pseudo-road surface 5 at a predetermined force, as shown in FIG. 4. A flow rate of water sucked up by the submersible pump 6*b* is controlled by a water flow rate-adjusting valve 6*e* and excess water is returned to the water supply tank 6*a* via reverse flow piping 6*f* branched from the water supply piping 6*c*.

Water constantly sprayed on the pseudo-road surface 5 to serve a wet performance test of the tire T is smoothly drained, without splashing, due to centrifugal force caused by rotation of the rotating drum 1, 11 into a drainage guide 7 disposed to surround the fixed support member 2 as a part of the water retrieval means 7, preferably via the tapered faces 5b and the continuous drainage grooves 5c formed in the inner surface of the pseudo-road surface 5.

Such smooth drainage as described above prevents water constantly sprayed on the pseudo-road surface 5 from being pushing up onto the pseudo-road surface 5 due to centrifugal force, thereby successfully making conditions of water film and the like on the pseudo-road surface 5 reliably constant and thus the wet performance conditions as a whole reliably stable.

Water, thus smoothly drained into the drainage guide 7a surrounding the fixed support member 2 and reaching the lower end of the drainage guide 7a, then flows into a drainage tank 7c via drainage piping 7b.

A filter 7d for filtering powder of worn tire and the like retrieved together with water is provided in the drainage tank 7c in the example shown in FIG. 4.

According to the structures described above, a wet performance test of a tire can be carried out with high precision because smooth drainage from the rotating drum 1 is facilitated by the tapered faces 5b and the continuous drainage grooves 5c formed in the pseudo-road surface 5 and sprayed water is prevented from splashing, such that the water film condition is made reliably stable, under the effects of the water supply means 6 and the water retrieval means 7.

Further, tire support means 5, 18 for supporting a tire T such that a ground contact surface thereof is brought into contact with the pseudo-road surface 5 as exemplarily shown in FIG. 5A to FIG. 6B is provided so that various types of tests can be carried out as desired for the tire T on the pseudo-road surface 5 attached on the inner peripheral surface of the rotating drum 1. Yet, further, the tire support means 8, 18 is provided with a load-adjusting member for controlling pressing force of the tire T with respect to the pseudo-road surface 5 to exert desired load on the tire T (a load-adjusting motor 8a, 18a in the drawings).

Figure 5A:
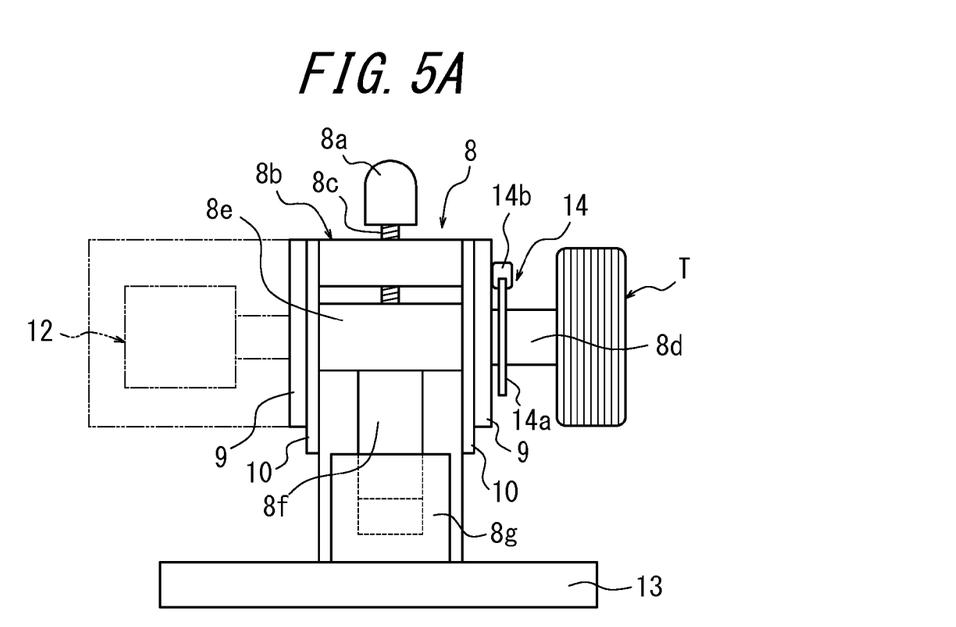
FIG. 5A is a side view showing one example of tire support means.
Figure 5B:
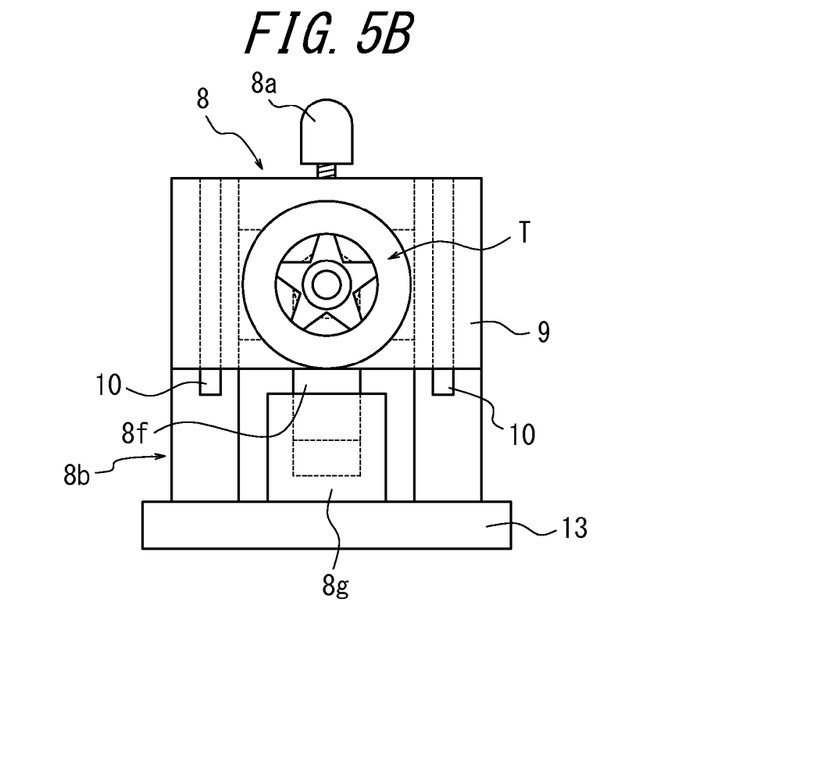
FIG. 5B is a front view showing the one example of the tire support means of FIG. 5A.

Pressing force exerted by the tire can be adjusted by the load-adjusting motor 8a as shown in FIG. 5A and FIG. 5B by, for example, screwing a male screw member 8c connected with an output shaft of the motor 8a through a frame 8b of the tire support means 8 (the motor 8a is fixed on the frame 8b) so that the tip end portion of the male screw member 8c is screwedly engaged with a bearing member 8e supporting a support shaft 8d of the tire T. Desired load can be exerted on the tire T mounted on the support shaft 8d via a dynamometer such as a 6-component dynamometer, a 3-component dynamometer and the like (not shown), by normally rotating the load-adjusting motor 8a to rotate the male screw member 8c so that the tire support shaft 8d, together with the bearing member 8e, descends for displacement. Load exerted on the tire T can be released by, for example, reversely rotating the motor 8a so that the tire support shaft 8d, together with the bearing member 8e, ascends for displacement. The tire T mounted on the support shaft 8d and thus bearing-supported by the bearing member 8e can be freely rotated by friction between the tire T and the pseudo-road surface 5 on the inner peripheral surface of the rotating drum 1.

Displacement in ascending/descending direction of the tire support shaft 8d and the bearing member 8e for bearing-supporting the support shaft 8d can be carried out satisfactorily smoothly and accurately by: providing sliders 9 at respective ends of the bearing member 8e and providing guide rails 10 at outer side surfaces of the frame 8b of the tire support means 8 so as to each extend in the vertical direction in FIG. 5A and FIG. 5B; guiding, in a sliding manner, displacement of the sliders 9 by the guide rails 10; providing a rod 8f such that the rod protrudes from the bearing member 8e downward as shown in FIGS. 5A and 5B; providing a cylindrical guide 8g such that the cylindrical guide stands upright on a base 13 of the tire support means 8; and guiding in a sliding manner the rod 8f by the cylindrical guide 8g.

Further, the tire support means 8 is provided with a disk brake 14 as one example of a braking system for exerting braking force on the tire T, as shown in FIG. 5A.

The disc brake 14 shown in FIG. 5A can be constituted of a brake rotor 14a fixed on the support shaft 8d and a caliper 14b for pinching the brake rotor 14a from both sides of the rotor. The disc brake 14 can decrease rotational peripheral speed of the tire T relative to peripheral speed of the pseudo-road surface 5 of the rotating drum 1, according to necessity.

Alternatively, an electronic braking system, an ABS braking system or the like may be used as the braking system.

The tire support means 8 for supporting the tire T may be provided with a driving/breaking force generating unit for applying rotational driving force/braking force to the tire T, e.g. a driving/braking force generating motor 12, as exemplarily shown by phantom line in FIG. 5A. The driving/braking force generating motor 12 is connected either directly or via a pulley, a gear box and the like with the drive shaft 8d provided to penetrate through the bearing member 8e, whereby the tire T can be driven at peripheral speed as desired.

The aforementioned braking system like the disc brake 14 can be omitted in a case where such a driving/braking force generating motor for driving the tire T at desired speed as described above is provided in the support means 8.

Figure 6A:
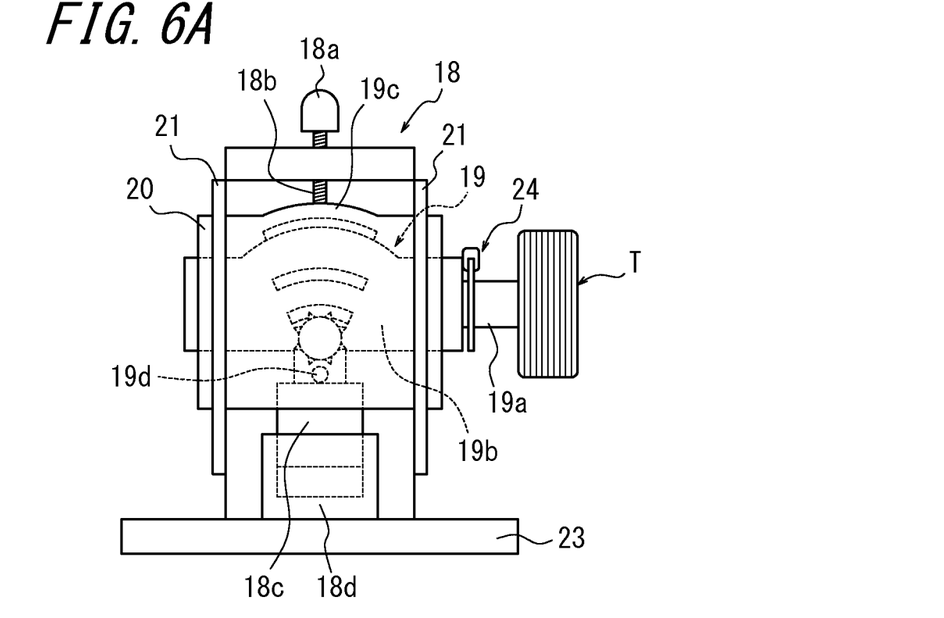
FIG. 6A is a side view showing another example of tire support means.
Figure 6B:
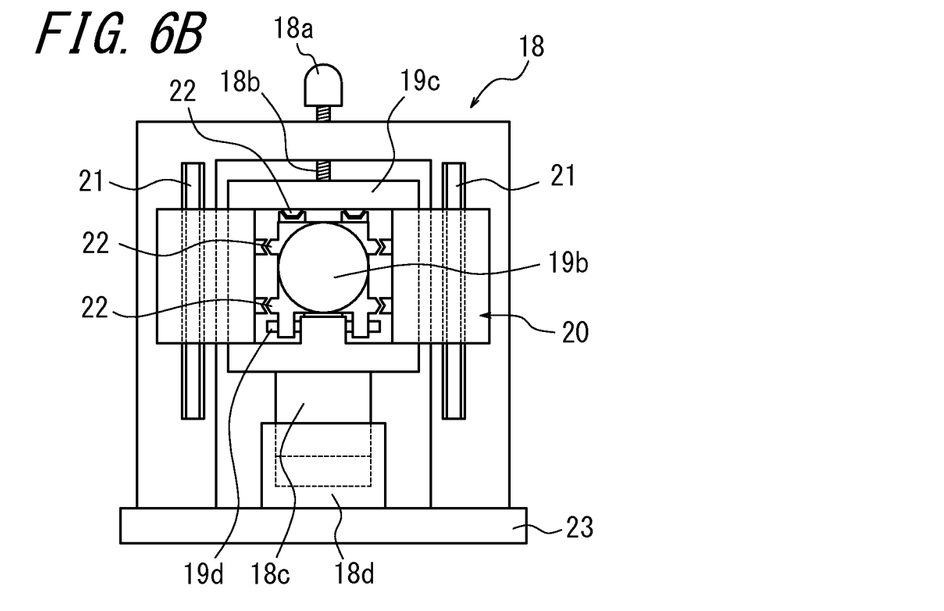
FIG. 6B is a rear side view showing the another example of the tire support means of FIG. 6A.

The tire support means 18 shown in FIG. 6A and FIG. 6B is provided with a camber angle-adjusting mechanism 19 as one example of a posture-adjusting mechanism for adjusting a posture in which a ground contact surface of a tire T is in contact with the pseudo-road surface 5. The camber angle-adjusting mechanism 19 is structured, for example, such that: the tire T is mounted on a support shaft 19a via a dynamometer (not shown); a bearing member 19b for bearing-supporting the support shaft 19a is accommodated within a housing 19c; sliders 20 are formed to be integral with the housing 19c; guide rails 21 are fixed on the tire support means 18; the male screw member 18b connected with the output shaft of the load-generating motor 18a is screwedly engaged with the housing 19c and the sliders 20 are slidingly engaged with the guide rails 21, so that the housing 19c can be slidingly displaced in the ascending/descending direction to controllably adjust pressing force of the tire T with respect to the pseudo-road surface 5 by the action of the motor 18a; and the bearing member 19b itself for supporting the support shaft 19a is pivotable around a center axis 19d with respect to the housing 19c in a side view of the tire support means 18 cut along a plane including the center axis of the support shaft 19a, shown in FIG. 6A. A camber angle as desired can be imparted to the tire T by, for example, pivoting the bearing member 19b by a required magnitude with respect to the housing 19c by a motor (not shown) along arcuate guide members 22 and retaining the bearing member 19b in the state thus pivoted.

The tire T can be imparted with a slip angle by, for example, making a base 23 of the tire support means 18 circular movement around the rotating drum 1 as desired by a motor and the like (not shown).

The support shaft 19a disposed to penetrate through the bearing member 19b can be rotationally driven as desired by a driving/braking force generating unit such as a driving/braking force generating motor (not shown) in the example shown in FIG. 6B. In this case, provision of a braking system such as a disc brake 24 in the tire support means 18 can be omitted.

Further, displacement of the housing 19c integral with the support shaft 19a and the bearing member 19b in the ascending/descending direction can be smoothly and accurately carried out by: providing a rod 18f such that the rod protrudes from the housing 19c downward as shown in FIGS. 6A and 6B; providing a cylindrical guide 18d such that the cylindrical guide stands upright on a base 23; and guiding in a sliding manner the rod 18c by the cylindrical guide 18d.

Figure 7:
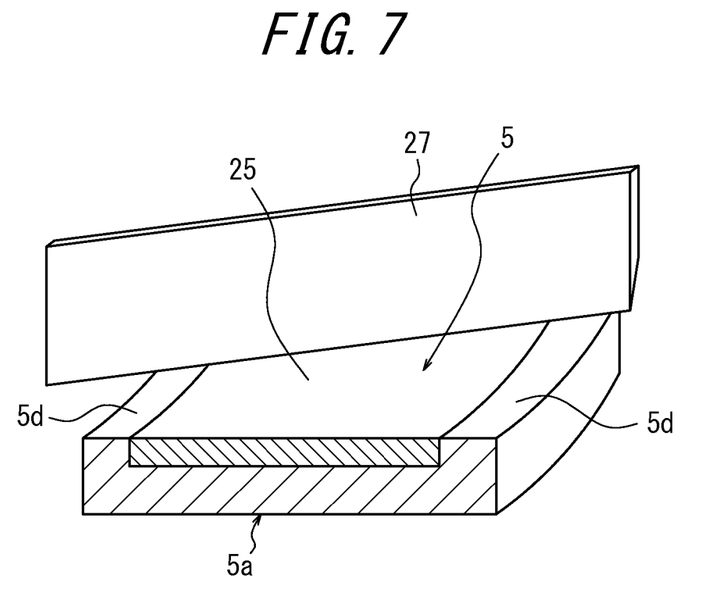
FIG. 7 is a partial cross sectional perspective view showing a segment having a pseudo-road surface with an ice layer formed thereon, as well as cutting means used for cutting the ice layer.

It is possible in the tire testing device of the present invention to form an ice layer 25 on the pseudo-road surface 5, so that an on-ice performance test can be carried out for a tire T, as shown in FIG. 7. The ice layer 25 on the pseudo-road surface 5 is formed by supplying water on the pseudo-road surface 5 and cooling the water thus supplied by cooling means 26 provided on the outer side of the sectioned chamber R exemplarily shown in FIG. 4.

A cooling pipe 26a, connected with the cooling means 26, is inserted into the interior of the sectioned chamber R and the tip end of the cooling pipe 26a is connected to the drainage guide 7a. The cooling means 26 uses a medium as cold as 0° C. or lower. The cold medium, when it is supplied from the cooling means 26 to the interior of the drainage guide 7a via the cooling pipe 26a, cools the interior of the drainage guide 7a to 0° C. or lower, i.e. below freezing temperature, thereby successfully freezing the water on the pseudo-road surface.

Segments 5a each having a recessed cross section as shown in FIG. 7 is used for the pseudo-road surface 5 when an on-ice performance test is carried out. The segment 5a shown in FIG. 7 has wall portions 5d protruding on the inner side in the radial direction of the rotating drum 1 at respective end portions in the axial direction of the rotating drum 1.

The ice layer 25 is formed on the pseudo-road surface 5 by: cooling the interior of the drainage guide 7a to predetermined temperature below freezing temperature by the cold medium from the cooling means 26; and sparely dropping water on the pseudo-road surface 5 via the water supply nozzle 6d, with rotating the rotating drum 1 slowly at predetermined speed. The water dropped on the pseudo-road surface 5 spreads thinly over the inner surface of the pseudo-road surface due to rotation of the rotating drum 1, is cooled by the cold medium and forms an ice layer on the pseudo-road surface 5. In this connection, water dropped on the pseudo-road surface 5 is prevented from flowing out of the pseudo-road surface 5 and an ice layer having a predetermined thickness is efficiently formed on the pseudo-road surface 5 because the segments 5a have recessed cross sections as described above. An ice layer 25 having predetermined thickness can be formed on the pseudo-road surface 5 by prolonging time during which water is dropped on the pseudo-road surface and thus gradually increasing thickness of a resulting ice layer.

Cutting means 27 may be provided for making a surface of the ice layer 25 thus formed on the pseudo-road surface 5 flat and smooth. FIG. 7 shows an example where cutting blades as the cutting means 27 are provided inside the rotating drum 1. In the example of FIG. 7, cutting blades as the cutting means 27 are placed at the inner surface of the pseudo-road surface 5 with predetermined distances therebetween to each face the inner surface, so that these cutting blades are brought into contact with a surface of an ice layer 25 having thickness exceeding predetermined thickness to cut the surface and make it flat and smooth as the rotating drum 1 rotates.

Accordingly, a flat ice layer 25 having predetermined thickness can be formed on the pseudo-road surface 5. The pseudo-road surface 5 thus prepared as an ice road with the ice layer 25 thereon can be used for an on-ice performance test of a tire T by running the tire T on the ice layer 25, i.e. the ice road.

The example shown in FIG. 7 employs as the segments for use in an on-ice performance test the segments 5a each having a recessed cross section. However, applications are not limited to the segment 5a of FIG. 7 in this connection but segments 5a having other configurations such as the segments 5a lacking the wall portions 5d and the drainage grooves 5c at the inner surface thereof as shown in FIG. 3A may alternatively used. It is even possible to form the ice layer 25 directly on the inner peripheral surface of the rotating drum 1 without using the segments 5a.

The tire testing device of the present invention can serve for an on-snow performance test of a tire T by forming a snow road on the pseudo-road surface by the known techniques, although details thereof are omitted.

In connection with the aforementioned one embodiment of the present invention described with reference to the drawings, the drainage grooves formed in the inner surface of the segment 5a may be modified as shown in the perspective views of FIGS. 8A to 8F, for example.

Specifically, modified examples shown in FIGS. 8A to 8F unanimously lack the tapered faces 5b at the respective end portions of the inner surfaces of the pseudo-road surfaces thereof. A modified example shown in FIG. 8A has the continuous drainage grooves 5c, similar to those shown in FIG. 3B and formed in the inner surface of each of the segments 5a constituting the pseudo-road surface 5 such that the continuous drainage grooves intersect each other to extend to the respective edge positions in the axial direction of the rotating drum 1.

Figure 8A:
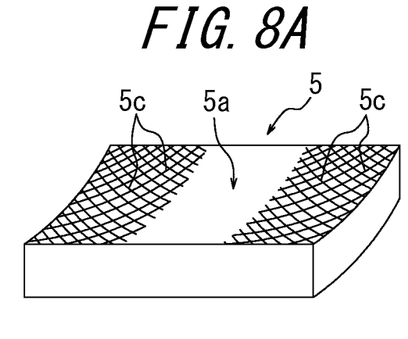
FIGS. 8A-8F are perspective views showing other modified examples of the segment.
Figure 8B:
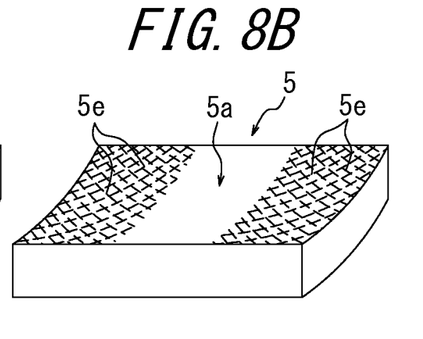
Figure 8C:
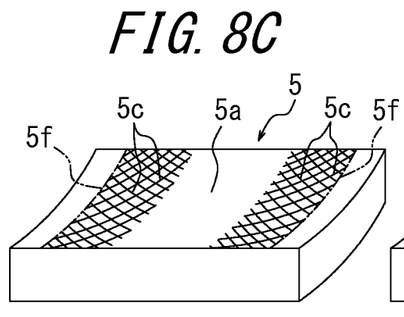

A modified example shown in FIG. 8B has drainage grooves 5e, similar to the continuous drainage grooves 5c of FIG. 8A but intermittently extending to the respective edge positions in the axial direction of the rotating drum 1 thereof. A modified example shown in FIG. 8C has the drainage grooves 5c, similar to the continuous drainage grooves 5c of FIG. 8A but extending to respective inner side edge positions 5f in the axial direction of the rotating drum 1 thereof, which respective inner side edge positions 5f correspond to the respective innermost edges in the drum axial direction of the tapered faces 5b of the pseudo-road surface 5 in the example shown in FIG. 3B.

Figure 8D:
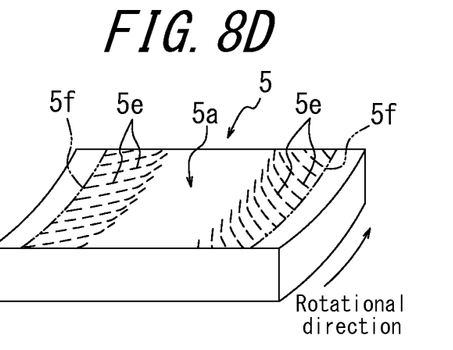

A modified example shown in FIG. 8D has the intermittent drainage grooves 5e, similar to the directional continuous drainage grooves 5c of FIG. 3C but intermittently extending to the aforementioned respective inner side edge positions 5f thereof.

Figure 8E:
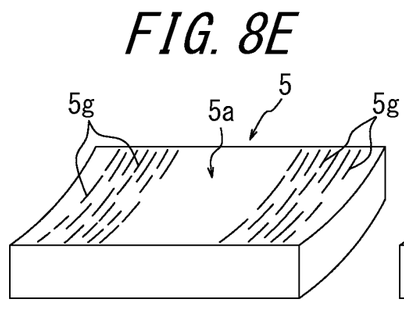
Figure 8F:
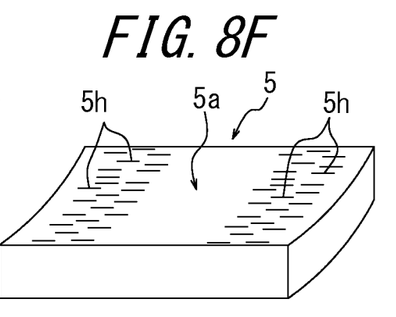

Further, a modified example shown in FIG. 8E has drainage grooves 5g formed to intermittently extend in the circumferential direction in each segment 5a of the pseudo-road surface 5. A modified example shown in FIG. 8F has drainage grooves 5h formed to intermittently extend in the widthwise direction in each segment 5a of the pseudo-road surface 5.

REFERENCE SIGNS LIST 1, 11 Rotating drum
1a, 11a Rails
2 Fixed support member
2a Fixation base
2b Guide groove
2c Observation hole
3 Rotation guide
4 Linear motor
4a Permanent magnet 4b Electromagnet
5 Pseudo-road surface
5a Segment
5b Tapered face
5c Continuous drainage groove
5d Wall portion
5e, 5g, 5h Drainage groove
5f Inner side edge position
6 Water supply means
6a Water supply tank
6b Submersible pump
6c Water supply piping
6d Water supply nozzle
6e Water flow rate-adjusting valve
6f Reverse flow piping
7 Water retrieval means
7a Drainage guide
7b Drainage piping
7c Drainage tank
7d Filter
8, 18 Tire support means
8a, 18a Load-adjusting motor
8b Frame
8c, 18b Male screw member
8d, 19a, Support shaft
8e, 19b Bearing member
8f, 18c Rod
8g, 18d Cylindrical guide
9, 20 Sliders
10, 21 Guide rails
11b Rectangular hole
12 Driving/braking force generating motor
13, 23 Base
14, 24 Disc brake
14a Brake rotor
14b Caliper
19 Camber angle-adjusting mechanism
19c Housing
19d Center axis
22 Arcuate guide member
25 Ice layer
26 Cooling means
26a Cooling pipe
27 Cutting means
T Tire
θ Taper angle
R Sectioned chamber

The invention claimed is:

1. A tire testing device, comprising:
   an inside drum-type cylindrical rotating drum having a pseudo-road surface provided on an inner peripheral surface thereof;
   a fixed support member surrounding an entire circumference of the rotating drum from the outer peripheral side of the drum via rotation guide means; and
   a linear motor provided between the rotating drum and the fixed support member, the linear motor configured to rotationally drive the rotating drum.

2. The tire testing device of claim 1, wherein the pseudo-road surface provided on the inner peripheral surface of the rotating drum is formed by plural segments having predetermined lengths in the circumferential direction of the rotating drum.

3. The tire testing device of claim 1, further comprising:
   water supply means for spraying water on the pseudo-road surface; and
   water retrieval means for recycling used water.

4. A tire testing device, comprising:
   an inside drum-type cylindrical rotating drum having a pseudo-road surface provided on an inner peripheral surface thereof;
   a fixed support member that surrounds the rotating drum from the outer peripheral side of the drum via rotation guide means; and
   a linear motor provided between the rotating drum and the fixed support member that rotationally drives the rotating drum, wherein an inner surface of the pseudo-road surface provided on the inner peripheral surface of the rotating drum has tapered faces at respective end portions, in the axial direction of the rotating drum, thereof such that thicknesses of the tapered faces decrease toward respective outer edges in the drum axial direction of the inner surface.

5. The tire testing device of claim 1, wherein drainage grooves are formed in the inner surface of the pseudo-road surface provided on the inner peripheral surface of the rotating drum.

6. The tire testing device of claim 1, further comprising:
   tire support means for supporting a tire such that a ground contact surface thereof is brought into contact with the pseudo-road surface; and
   a load-adjusting member provided in the tire support means, for controllably adjusting pressing force exerted by the tire against the pseudo-road surface.

7. The tire testing device of claim 6, where the tire support means is provided with a braking system for applying braking force on the tire.

8. The tire testing device of claim 6, where the tire support means is provided with a driving/braking force generating unit for applying rotational driving force/braking force on the tire.

9. The tire testing device of claim 6, where the tire support means is provided with a posture-adjusting mechanism for adjusting a posture including a camber angle and a slip angle in which the ground contact surface of the tire is in contact with the pseudo-road surface.

10. The tire testing device of claim 9, where the tire support means is provided with an actuator for actuating the posture-adjusting mechanism to change a posture in which the ground contact surface of the tire is in contact with the pseudo-road surface.

11. The tire testing device of claim 1, further comprising cooling means for cooling water on the pseudo-road surface to form an ice layer over the pseudo-road surface.

12. A tire testing device, comprising:
   an inside drum-type cylindrical rotating drum having a pseudo-road surface provided on an inner peripheral surface thereof;
   a fixed support member that surrounds the rotating drum from the outer peripheral side of the drum via rotation guide means; and
   a linear motor provided between the rotating drum and the fixed support member that rotationally drives the rotating drum, wherein the rotation guide means is constituted of a pair of rails provided in parallel to each other on an outer peripheral surface of the rotating drum and a pair of guide grooves formed in an inner peripheral surface of the fixed support member, which rails and grooves are slidably engaged with each other, and the linear motor is a linear synchronous motor constituted of permanent magnets provided on a side surface of at least one of the rails such that polarities of the permanent magnets change alternately; and electromagnets as thrust magnets provided on a side surface, facing the side surface of the rail, of at least one of the guide grooves such that polarities of the electromagnets change alternately.

* * * * *